US005695550A

United States Patent [19]

Marx et al.

[11] Patent Number: 5,695,550

[45] Date of Patent: Dec. 9, 1997

[54] FOUNTAIN SOLUTION COMPOSITION

[75] Inventors: Alan L. Marx, Logan; David C. Marx, Hyde Park; Ronald G. Case, Wellsville, all of Utah

[73] Assignee: Ink, Inc., Logan, Utah

[21] Appl. No.: 695,428

[22] Filed: Aug. 12, 1996

[51] Int. Cl.$^6$ .................... C09K 3/18

[52] U.S. Cl. .................... 106/2; 101/451

[58] Field of Search .................... 106/2; 101/451

[56] References Cited

U.S. PATENT DOCUMENTS

| | | | |
|---|---|---|---|
| 3,398,002 | 8/1968 | Bondurant et al. | 106/2 |
| 4,769,072 | 9/1988 | Bondurant et al. | 106/2 |
| 5,165,344 | 11/1992 | Matsumoto et al. | 106/2 |
| 5,282,892 | 2/1994 | Laufs | 106/2 |
| 5,338,344 | 8/1994 | Bondurant | 106/2 |

OTHER PUBLICATIONS

Brochure entitled "pH, Conductivity & Offset Printing," Polychrome Technical Bulletin No. 1, Polychrome Corporation, 1987, No Month available.

Material Safety Data Sheets of Varn Products Company, Inc., Apr. 1, 1989.

Material Safety Data Sheets of Polychrome Corporation, Nov., 1985.

Material Safety Data Sheets of Hurst Graphics, Inc., Nov., 1993.

Material Safety Data Sheets of Rosos Research Laboratories, Inc., 1990, 1991, 1993.

Material Safety Sheets of RBP Chemical Corporation, Dec. 19, 1995.

Material Safety Data Sheets of Printers Pacific, Inc., Oct., 1991.

*Primary Examiner*—Helene Klemanski

*Attorney, Agent, or Firm*—Workman, Nydegger & Seeley

[57] ABSTRACT

The present invention is directed to a fountain solution for use in offset printing processes. The fountain solution is formed by diluting a fountain solution concentrate with water in a water to fountain solution concentrate ratio of between about 4:1 to about 8:1. The fountain solution concentrate comprises glycerin in an amount between about 2% to about 9% by volume, 2-butoxy-ethanol in an amount between about 4% to about 10% by volume, isopropyl alcohol in an amount between about 8% to about 35% by volume, water in an amount between about 54% to about 65% by volume and at least one compound selected from the group consisting of ethylene glycol and propylene glycol.

25 Claims, 1 Drawing Sheet

FOUNTAIN SOLUTION COMPOSITION

BACKGROUND OF THE INVENTION

1. The Field of the Invention

The present invention is directed to fountain solutions used in offset printing processes. In particular, the present invention is directed to fountain solution concentrates that are diluted with water to form fountain solutions used in offset printing processes.

2. The Relevant Technology

Offset priming is a process which relies on the principle that an image area of a printing plate accepts ink while a non-printing area repels ink. Prior to applying ink to the printing plate, a solution referred to as a fountain solution is mixed with an appropriate ink and applied to the surface of the printing plate. The fountain solution causes the non-image portion of the plate to repel ink while allowing the image portion to accept ink. Using offset printing, the ink-coated image is ultimately transferred to a substrate, such as paper, producing an image corresponding to the image on the plate.

For high quality prints to be produced using offset printing processes, it is essential that the fountain solution allow ink to adhere to the image area, yet prevent ink from adhering to the non-image area of the printing plate. If the non-image area of the plate accepts even a minute amount of ink, the printed product will be flawed.

Fountain solutions are typically prepared by diluting a fountain solution concentrate with isopropyl alcohol and water. One advantage of using isopropyl alcohol is that it functions as a wetting agent. Therefore, large amounts of isopropyl alcohol allow the fountain solution to reach the ends of large press rollers, ensuring uniform distribution of the solution on the plate. Another advantage, is that large amounts of isopropyl alcohol decrease the amount of water reaching the plate. These and other characteristics enable isopropyl alcohol containing fountain solutions to form high quality printed image products. It is, therefore, common for conventional fountain solutions to contain as much as 35% by volume of the fountain solution.

While fountain solutions containing isopropyl alcohol produce high quality images, the use of large amounts of isopropyl alcohol has its drawbacks. For example, since isopropyl alcohol is a volatile liquid, it quickly evaporates. Evaporation of isopropyl alcohol from a fountain solution affects the conductivity of the fountain solution and causes toxic fumes to be released into the environment. If too much isopropyl alcohol is present in the fountain solution, the isopropyl alcohol will evaporate on the printing plate leaving an insufficient amount of fountain solution to protect the non-image portion of the printing plate from the ink applied for printing. Insufficient amounts of fountain solution on the non-image portion of the plate result in problems such as scumming, toning, and premature plate wear. Scumming occurs when the non-image portion of the printing plate accepts ink and subsequently transfers the ink to the printed substrate, flawing the printed product. Toning is the adherence of ink particles to the non-image areas of the printing plate which tint the background portion of the printed product. These particles of ink left behind due to toning require frequent laborious plate cleaning.

Another problem encountered with conventional fountain solutions is that different fountain solutions are required for different inks and papers. In other words, if a different ink is used, or if the image is printed on a different paper, the fountain solution typically must be changed. For example, a fountain solution containing 20% by volume isopropyl alcohol may produce high quality prints with an oil based ink, but may not be compatible with a rubber based ink. Furthermore, a specific ink may not produce high quality prints when used with fountain solutions containing 20% by volume of isopropyl alcohol, but will produce high quality prints when the isopropyl content in the fountain solution is 15% by volume. Likewise, a specific fountain solution may produce high quality images on a conventional paper, yet not produce high quality images on a glossy paper. Hence, to consistently produce high quality prints typically requires stocking many different papers, inks and fountain solutions. This is especially problematic when the type of ink or paper used is changed during printing, requiring the fountain solution to be modified to ensure consistent print quality.

Still another disadvantage of conventional fountain solutions is the long ink drying times required, commonly between 1 to 2 days, before prints can be handled. In addition, to dry the ink, the prints are placed on racks occupying large areas of space. Such time and space requirements provide a significant economic burden to offset printing processes.

In view of the foregoing, it is apparent there is a need for a fountain solution that consistently produces high quality printed images without releasing significant amounts of toxic or hazardous fumes into the environment.

It is further apparent that there is a need for a fountain solution that repels ink from the non-image areas of the printing plate without quickly evaporating.

Additionally, there is a need for a fountain solution capable of forming print quality images with a variety of different inks and papers without having to alter or modify the fountain solution.

Finally, there is a need for a fountain solution capable of consistently forming print quality images without requiring excessive ink drying periods.

SUMMARY AND OBJECTS OF THE INVENTION

It is, therefore, an object of the present invention to provide a fountain solution for use with offset printing processes that consistently produces high quality prints.

It is another object of the present invention to provide a fountain solution for use in offset printing processes that does not release significant amounts of toxic fumes into the environment.

It is still another object of the present invention to provide a fountain solution for use with offset printing processes which produces a printed ink image that does not require significant drying periods prior to cutting, folding, or handling.

It is a further object of the present invention to provide a fountain solution that can be used with a wide variety of inks.

Still further, it is an objective of the present invention to provide a fountain solution concentrate that does not contain, or require the addition of large amounts of isopropyl alcohol.

To achieve the foregoing objects, and in accordance with the invention as embodied and broadly described herein, the present invention is directed to a fountain solution comprising a fountain solution concentrate which when combined with an appropriate amount of water produces a fountain solution for use in offset printing processes.

In accord with the present invention, and contrary to conventional knowledge, improved fountain solutions have been discovered that are capable of forming high quality images on substrates without encountering the problems associated with conventional fountain solutions. The improved fountain solutions of the present invention also produce printed substrates having fast ink drying times. The elimination of unreasonable drying times and consequently space consuming drying racks allows print quality images to be economically mass produced. Furthermore, the improved fountain solutions of the present invention do not readily evaporate from the printing plate, reducing the incidence of toxic fumes as well as scumming, toning, premature plate wear, and other problems associated with the absence of fountain solution on the printing plate. Moreover, the improved fountain solutions of the present invention are versatile enough to be used with a wide variety of inks.

In a preferred embodiment of the present invention, the fountain solution comprises a fountain solution concentrate mixed with water in an amount to result in a water to fountain solution concentrate ratio in the range of about 4:1 to about 8:1 by volume. The fountain solution concentrate preferably comprises a mixture of glycerin, 2-butoxy-ethanol, isopropyl alcohol, water and at least one compound selected from the group consisting of ethylene glycol and propylene glycol. In a more preferred embodiment, the fountain solution concentrate comprises both ethylene glycol and propylene glycol.

Although the fountain solution concentrate comprises isopropyl alcohol, it is present in much lower quantities than heretofore used. According to the present invention, isopropyl alcohol is present in the fountain solution in an amount up to about 7% by volume of the total fountain solution, and preferably present in about 1.4%. Instead of large quantities of isopropyl alcohol, other components such as glycerin, 2-butoxy-ethanol, ethylene glycol, propylene glycol and larger amounts of water are employed in the fountain solution.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawing. Understanding that this drawing depicts only a typical embodiment of the invention and is not therefore to be considered to be limiting of its scope, the invention will be described and explained with additional specificity and detail through the use of the accompanying drawing in which.

DETAILED DESCRIPTION OF THE PREFERRED EMBODIMENTS

Figure 1:
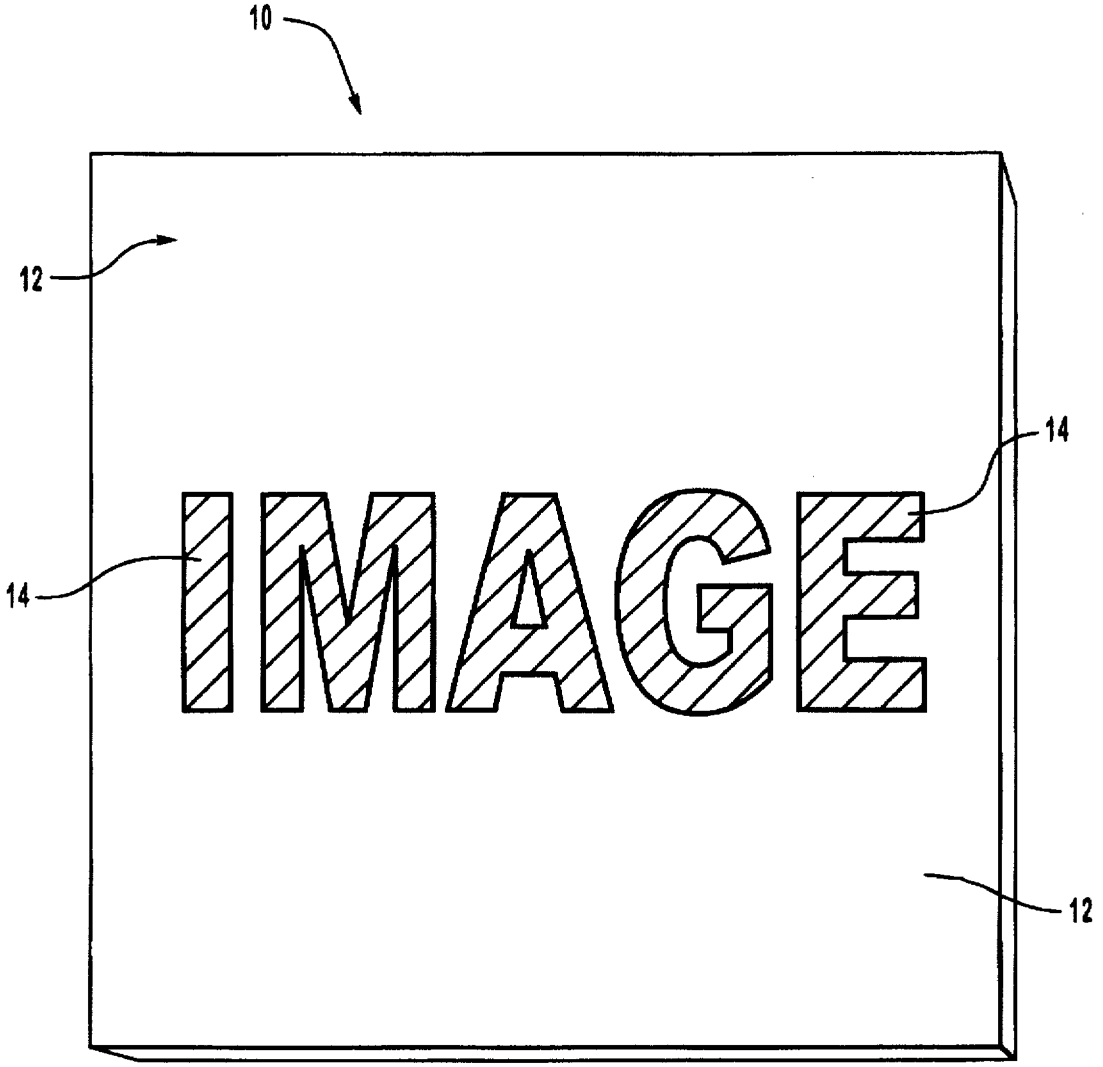
FIG. 1 illustrates a printing plate 10 having an image area 14 and a non-image area 12.

The present invention is directed to fountain solutions for use in offset printing processes. In addition, the present invention is drawn to fountain solution concentrates (also referred to as "concentrates") that are mixed with water to form fountain solutions.

Fountain solutions are commonly formed by mixing a fountain solution concentrate with isopropyl alcohol and water. Although the amount of isopropyl alcohol varies, it is frequently as much as 35% by volume of the total fountain solution. Even though large amounts of isopropyl alcohol produce high quality printed substrates, the use of large amounts of isopropyl alcohol has proven problematic. For example, because isopropyl alcohol is a volatile liquid, the isopropyl alcohol readily evaporates affecting the conductivity of the fountain solution and releasing toxic, flammable fumes into the environment. Likewise, if too much isopropyl alcohol is used, the isopropyl alcohol will evaporate on the printing plate, leaving portions of the non-image area of the plate exposed to ink, resulting in scumming, toning and premature plate wear.

Another problem encountered with conventional fountain solutions is the long ink drying times required, often as long as 1 to 2 days, before the print can be cut, bent, folded, or otherwise handled. In addition, the wet ink prints are placed on space consuming racks to dry. Such time and space requirements are significant burdens on the economic feasibility of offset printing processes.

It is a feature of the present invention to prepare a fountain solution comprising isopropyl alcohol in a range between about 0.8% to about 7% by volume of the total fountain solution. Fountain solutions formed according to the present invention are formed by mixing a fountain solution concentrate with a suitable quantity of water.

In one embodiment, the fountain solutions concentrate is formed by mixing suitable amounts of water, isopropyl alcohol, glycerin, 2-butoxy-ethanol, and at least one of the group consisting of ethylene glycol and propylene glycol. In a more preferred embodiment of the present invention, the fountain solution concentrate includes both ethylene glycol and propylene glycol. To form a fountain solution, the fountain solution concentrate is mixed with water in an amount to result in a water to fountain solution concentrate ratio in the range of about 4:1 to about 8:1 by volume. More preferably, the fountain solution concentrate is mixed with water in an amount to result in a water to fountain solution concentrate ratio in the range of about 5:1 to about 7:1 by volume. The water and fountain solution concentrate are mixed by any suitable means known in the art.

It is apparent to one of ordinary skill in the art in view of the present invention that the specific amounts of each of the components used to prepare the fountain solution will vary depending on numerous factors. These factors include, but are not limited to the types of presses, plates, inks, and substrates used, as well as the specific application of the fountain solution. Furthermore, the exact formulation of the concentrate used in the fountain solution may depend on the water used, i.e., whether the water is soft, hard, or medium.

Referring now to the specific components of the fountain solution concentrate, the concentration of water used to form the concentrate is preferably in the range from about 44% to about 68% by volume of the concentrate, more preferably from about 61% to about 65%, and most preferably about 64%. The isopropyl alcohol concentration used to form the fountain solution concentrate is preferably in the range from about 8% to about 36% by volume of the concentrate, more preferably from about 8% to about 10%, and most preferably about 9%. The concentration of the glycerin used to form the fountain solution concentrate is preferably in the range from about 2% to about 9% by volume of the concentrate, more preferably from about 7% to about 9%, and most preferably about 8%. The 2-butoxy-ethanol concentration used to form the fountain solution concentrate is preferably in the range from about 2% to about 10% by volume of the concentrate, more preferably between about 6% to about 10%, and most preferably about 9%.

At least one of the group consisting of ethylene glycol and propylene glycol is present in the fountain solution concentrate, and preferably both ethylene glycol and propylene glycol are present in the concentrate. When ethylene glycol is used to form the fountain solution concentrate, it is preferably used in the range from about 4% to about 9% by volume of the concentrate, and more preferably about 5%. When the propylene glycol is used to form the fountain solution concentrate, it is preferably used in the range from about 4% to about 13% by volume of the concentrate, more preferably about 4% to about 9%, and most preferably in about 9%.

In a preferred embodiment, the fountain solution concentrate is formed by mixing together isopropyl alcohol in about 9% by volume, ethylene glycol in about 5% by volume, propylene glycol in about 5% by volume, glycerin in about 8% by volume, 2-butoxy-ethanol in about 9% by volume, and water in about 64% by volume. The concentrate is then mixed using any suitable means known in the art.

Referring now to FIG. 1, after the fountain solution has been thoroughly mixed, the fountain solution is combined with a suitable ink and applied to printing plate 10 by any suitable means known in the art. As is apparent to one of ordinary skill in the art in view of the present invention, the ink adheres only to the image area 14 of the printing plate, while the fountain solution inhibits the non-image area from accepting ink. With ink adhering only to the image portion, the image is ultimately transferred to a suitable substrate using conventional offset printing techniques.

As is apparent to one of ordinary skill in the art in view of the present invention, the amount of fountain solution applied to the printing plate will depend on a number of factors, such as the size of the printing plate. In a preferred embodiment, the fountain solution is continuously supplied to the printing plate as needed to cover the plate.

EXAMPLES

Numerous concentrations of the fountain solution concentrate components were tested to determine the optimal formulation of the concentrate and to demonstrate the printing characteristics of each of the fountain solutions. The following non-restrictive examples illustrate useful ranges of the individual components in the fountain solution concentrate. The various formulations were prepared as fountain solution concentrates, mixed with water in an amount to result in a water to concentrate ratio of between about 4:1 to about 8:1, and tested for their abilities to function as fountain solutions.

In each of the runs disclosed, the print characteristics were observed and the overall usefulness of the fountain solution was determined. The ingredients used to form each fountain solution concentrate are listed by percent volume of the fountain solution concentrate in the tables below.

Example Group 1

| Ingredient | Run 1.1 | Run 1.2 | Run 1.3 | Run 1.4 | Run 1.5 | Run 1.6 |
|---|---|---|---|---|---|---|
| Water | 69.83% | 61.27% | 54.59% | 49.21% | 44.80% | 41.12% |
| Isopropyl Alcohol | 0.0% | 12.25% | 21.83% | 29.53% | 35.84% | 41.12% |
| Ethylene Glycol | 11.17% | 9.80% | 8.73% | 7.87% | 7.17% | 6.58 |

-continued

| Ingredient | Run 1.1 | Run 1.2 | Run 1.3 | Run 1.4 | Run 1.5 | Run 1.6 |
|---|---|---|---|---|---|---|
| Glycerin | 8.94% | 7.84% | 6.99% | 6.30% | 5.73% | 5.26% |
| 2-Butoxy-ethanol | 10.06% | 8.82% | 7.86% | 7.09% | 6.45% | 5.92% |
| Per-fomance | Poor | Marginal | Good | Good | Good | Marginal |

Six fountain solution concentrates were tested with varying concentrations of isopropyl alcohol. The other components present in the concentrate were held constant with respect to each other. In Example Group 1, in addition to isopropyl alcohol, each of the fountain solution concentrate compositions included a mixture of water, ethylene glycol, glycerin and 2-butoxy-ethanol. Propylene glycol was not used in any of the formulations tested in Experimental Group 1.

As illustrated in Run 1.1, fountain solution concentrates containing no isopropyl alcohol resulted in poor quality prints. However, as shown in Runs 1.2 to 1.6, the inclusion of isopropyl alcohol improved the printing performance of the fountain solution concentrate. For example, as the isopropyl alcohol content was increased, an increase in the print quality was observed in Runs 1.3, 1.4 and 1.5. In addition, to good overall performance, Runs 1.3, 1.4 and 1.5, exhibited good ink holding characteristics and easy plate cleaning characteristics.

As the isopropyl alcohol content was increased to an amount equal to the water content, as shown in Run 1.6, the fountain solution concentrate began drying on the printing plate resulting in scumming, toning and premature plate wear.

Example Group 2

| Ingredient | Run 2.1 | Run 2.2 | Run 2.3 |
|---|---|---|---|
| Water | 70.62% | 61.88% | 55.07% |
| Isopropyl Alcohol | 10.17% | 8.91% | 7.93% |
| Ethylene Glycol | 0.0% | 12.38% | 22.03% |
| Glycerin | 9.04% | 7.92% | 7.05% |
| 2-Butoxy-Ethanol | 10.17% | 8.91% | 7.93% |
| Performance | Marginal | Good | Marginal |

Various fountain solution concentrates were tested in Example Group 2, varying the concentration of propylene glycol to determine an acceptable range of use for propylene glycol, when used with specific concentrations of the other concentrate components. The concentrations of water, isopropyl alcohol, glycerin and 2-butoxy-ethanol were each held constant with respect to each other, while the propylene glycol concentration was varied. Ethylene glycol was not used in any of the fountain solution concentrate formulations illustrated in Experimental Group 2.

When neither propylene glycol or ethylene glycol were used to form the fountain solution concentrate, as in Run 2.1, the prints obtained were only of marginal quality. The print quality observed increased when propylene glycol was included in the concentrate, as illustrated by Run 2.2. As illustrated in Run 2.3, however, when the propylene glycol content reached a certain level, the print quality decreased.

Example Group 3

| Ingredient | Run 3.1 | Run 3.2 | Run 3.3 |
|---|---|---|---|
| Water | 67.45% | 64.54% | 59.43% |
| Isopropyl Alcohol | 9.71% | 9.29% | 8.56% |
| Ethylene Glycol | 4.50% | 4.30% | 7.92% |
| Propylene Glycol | 0.0% | 4.30% | 7.92% |
| Glycerin | 8.63% | 8.26% | 7.61% |
| 2-Butoxy-ethanol | 9.71% | 9.29% | 8.56% |
| Performance | Good | Excellent | Marginal |

Example Group 3, illustrates an embodiment of the present invention wherein the fountain solution concentrate comprised at least one of the group consisting of ethylene glycol and propylene glycol, and preferably both in increasing levels, while all other components in the mixture were held constant. For example in Run 3.1, a fountain solution comprising water, isopropyl alcohol, glycerin, 2-butoxy-ethanol and ethylene glycol, wherein ethylene glycol was present in about 4.5% by volume, exhibited good printing characteristics.

Furthermore, as illustrated in Run 3.2, when propylene glycol was also added to the fountain solution concentrate in the same proportion as ethylene glycol, about 4.30%, the print quality observed was excellent. When the propylene glycol and ethylene glycol concentrations were increased to about 5.00%, illustrated in Run 3.3, excellent fountain solution concentrate characteristics were again observed. The excellent characteristics observed in Runs 3.2 and 3.3 include: good printing characteristics, easy plate cleaning, excellent ink spreading, good color, no run-ins, and rapid ink drying.

Increasing both the propylene glycol and the ethylene glycol concentrations to about 7.92% by volume of the concentrate, while holding all the other ingredients constant, resulted in a less desirable printing performance, specifically exhibiting problems such as the fountain solution drying on the printing plate and difficult plate cleaning.

Example Group 4

| Ingredient | Run 4.1 | Run 4.1A | Run 4.2 | Run 4.3 | Run 4.3A | Run 4.4 | Run 4.5 |
|---|---|---|---|---|---|---|---|
| Water | 64.99% | 64.29% | 63.61% | 62.29% | 61.03% | 58.64% | 57.52% |
| Isopropyl Alcohol | 9.36% | 9.26% | 9.16% | 8.97% | 8.79% | 8.44% | 8.28% |
| Ethylene Glycol | 8.67% | 8.57% | 8.48% | 8.31% | 8.14% | 7.82% | 7.67% |
| Propylene Glycol | 8.67% | 8.57% | 8.48% | 8.31% | 8.14% | 7.82% | 7.67% |
| Glycerin | 8.32% | 8.23% | 8.14% | 7.97% | 7.81% | 7.51% | 7.36% |
| 2-Butoxy-ethanol | 0.0% | 1.07% | 2.12% | 4.15% | 6.10% | 9.77% | 11.50% |
| Performance | Poor | Marginal | Adequate | Good | Excellent | Adequate | Marginal |

The fountain solution concentrate in Example Group 4 comprised water, isopropyl alcohol, ethylene glycol, propylene glycol, glycerin in constant ratios, with varying amounts of 2-butoxy-ethanol. As illustrated in Run 4.1, fountain solution concentrates comprising the above mentioned components, in the ratios disclosed, exhibited poor print printing characteristics when no 2-butoxy-ethanol was included in the concentrate.

In Run 4.1A, 2-butoxy-ethanol was included in about 1.07% by volume of the fountain solution concentrate. Although the printing performance of the fountain solution concentrate improved with the inclusion of 2-butoxy-ethanol, the fountain solution concentrate performance was still only marginal. When the 2-butoxy-ethanol concentration was increased to about 2.12%, an improvement in performance was again observed, exhibiting very good ink drying, easy clean up, good ink spreading and no run-ins.

As illustrated in Runs 4.2, 4.3 and 4.4, the performance of the fountain solution continued to increase as the 2-butoxy-ethanol concentration increased up to a concentration of at least 6.10% by volume of the concentrate. The use of 9.77% by volume of 2-butoxy-ethanol in the fountain solution concentrate exhibited adequate performance characteristics, however, less desirable characteristics than were obtained using between 4.15% to about 6.10% by volume of 2-butoxy-ethanol. Using the above ingredients in the above mentioned concentrations, the use of 2-butoxy-ethanol in about 11.50% by volume resulted in only marginal printing quality.

Example Group 5

| Ingredient | Run 5.1 | Run 5.1A | Run 5.2 | Run 5.3 |
|---|---|---|---|---|
| Water | 65.22% | 64.86% | 63.83% | 58.82% |
| Isopropyl Alcohol | 8.70% | 8.65% | 8.51% | 7.84% |
| Ethylene Glycol | 8.70% | 8.65% | 8.51% | 7.84% |
| Propylene Glycol | 8.70% | 8.65% | 8.51% | 7.84% |
| Glycerin | 0.0% | 0.54% | 2.13% | 9.80% |
| 2-Butoxy-ethanol | 8.70% | 8.65% | 8.51% | 7.84% |
| Performance | Poor | Marginal | Good | Marginal |

Various fountain solution concentrates comprising water, isopropyl alcohol, ethylene glycol, propylene glycol and 2-butoxy-ethanol were tested with differing amounts of glycerin, as illustrated in Example Group 5. All components other than glycerin were held constant with respect to each other.

Poor print performance was observed for the fountain solution containing no glycerin as illustrated in Run 5.1. The print performance increased when the glycerin concentration increased to about 8.51% as illustrated in Run 5.2, but exhibited only marginal performance when increased to 8.65% and above.

It is understood by one of ordinary skill in the art that the foregoing examples are only illustrative of representative fountain solution concentrates and that differing proportions and concentrations of the components are within the scope of the present patent. Hence the foregoing examples should not be read to limit the scope of the present patent.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A composition for use as a fountain solution concentrate, said composition consisting essentially of:
   water in an amount between about 44% to about 68% by volume;
   isopropyl alcohol in an amount between about 8% to about 36% by volume;
   glycerin in an amount between about 2% to about 9% by volume;
   2-butoxy-ethanol in an amount between about 2% to about 10% by volume;
   at least one compound selected from the group consisting of ethylene glycol and propylene glycol.

2. A composition as recited in claim 1, wherein said ethylene glycol is present in said solution in an amount between about 4% to about 9% by volume and said propylene glycol is present in an amount between about 4% to about 13% by volume.

3. A composition as recited in claim 1, wherein said composition comprises said water in an amount between about 61% to about 65% by volume.

4. A composition as recited in claim 1, wherein said composition comprises said isopropyl alcohol in an amount between about 8% to about 10% by volume.

5. A composition as recited in claim 1, wherein said composition comprises said glycerin in an amount between about 7% to about 9% by volume.

6. A composition as recited in claim 1, wherein said composition comprises said 2-butoxy-ethanol in an amount between about 6% to about 10% by volume.

7. A composition as recited in claim 1, wherein said composition comprises said ethylene glycol in an amount between about 4% to about 9% by volume.

8. A composition as recited in claim 1, wherein said composition comprises said propylene glycol in an amount between about 4% to about 9% by volume.

9. A composition as recited in claim 1, wherein said composition comprises about 64% by volume of said water.

10. A composition as recited in claim 1, wherein said composition comprises about 9% by volume of said isopropyl alcohol.

11. A composition as recited in claim 1, wherein said composition comprises about 5% by volume of said ethylene glycol.

12. A composition as recited in claim 1, wherein said composition comprises about 5% by volume of said propylene glycol.

13. A composition as recited in claim 1, wherein said composition comprises about 8% by volume of said glycerin.

14. A composition as recited in claim 1, wherein said composition comprises about 9% by volume of said 2-butoxy-ethanol.

15. A composition for use as a fountain solution concentrate, said composition consisting essentially of:
   isopropyl alcohol in about 9% by volume;
   ethylene glycol in about 5% by volume;
   propylene glycol in about 5% by volume;
   glycerin in about 8% by volume;
   2-butoxy-ethanol in about 9% by volume; and
   water in about 64% by volume.

16. A composition for use as a fountain solution, said composition consisting essentially of:
   a) a fountain solution concentrate including:
      water in an amount between about 44% to about 68% by volume;
      isopropyl alcohol in an amount between about 8% to about 36% by volume;
      glycerin in an amount between about 2% to about 9% by volume;
      2-butoxy-ethanol in an amount between about 2% to about 10% by volume;
      at least one compound selected from the group consisting of ethylene glycol and propylene glycol;
   b) water, wherein said water is added to said fountain solution concentrate so as to result in a fountain solution concentrate to water ratio in a range from about 4:1 to about 8:1.

17. A composition as recited in claim 16, wherein said fountain solution has a water to fountain solution concentrate ratio in a range from about 5:1 to about 7:1.

18. A composition for use as a fountain solution, said composition consisting essentially of:
   a) a fountain solution concentrate including:
      isopropyl alcohol in about 9% by volume;
      ethylene glycol in about 5% by volume;
      propylene glycol in about 5% by volume;
      glycerin in about 8% by volume;
      2-butoxy-ethanol in about 9% by volume; and
      water in about 64% by volume;
   b) water, wherein said water is added to said fountain solution concentrate so as to result in a fountain solution concentrate to water ratio in a range from about 4:1 to about 8:1.

19. A composition for use as a fountain solution as recited in claim 18, wherein said fountain solution has a water to fountain solution concentrate ratio in a range from about 5:1 to about 7:1.

20. A composition for use as a fountain solution concentrate, said composition consisting essentially of a product formed by mixing together:
   water in an amount between about 44% to about 68% by volume;
   isopropyl alcohol in an amount between about 8% to about 36% by volume;
   glycerin in an amount between about 2% to about 9% by volume;
   2-butoxy-ethanol in an mount between about 2% to about 10% by volume;
   at least one compound selected from the group consisting of ethylene glycol and propylene glycol.

21. A composition as recited in claim 20, wherein said ethylene glycol is present in said solution in an amount between about 4% to about 9% by volume and said propylene glycol is present in an amount between about 4% to about 9% by volume.

22. A composition for use as a fountain solution concentrate, said composition consisting essentially of a product formed by mixing together:

water in about 64% by volume;

isopropyl alcohol in about 9% by volume;

glycerin in about 8% by volume;

2-butoxy-ethanol in about 9% by volume;

ethylene glycol in about 5% by volume; and propylene glycol in about 5% by volume.

23. A composition for use as a fountain solution, said composition consisting essentially of a product formed by mixing together:

a) a fountain solution concentrate including:
   - water in an amount between about 44% to about 68% by volume;
   - isopropyl alcohol in an amount between about 8% to about 36% by volume;
   - glycerin in an amount between about 2% to about 9% by volume;
   - 2-butoxy-ethanol in an amount between about 2% to about 10% by volume;
   - at least one of the group consisting of ethylene glycol and propylene glycol; and b) water, wherein said water is added to said fountain solution concentrate so as to result in a fountain solution concentrate to water ratio in a range from about 4:1 to about 8:1.

24. A fountain solution as recited in claim 23, wherein said fountain solution has a water to fountain solution concentrate ratio in a range from about 5:1 to about 7:1.

25. A composition for use as a fountain solution, said composition consisting essentially of a product formed by mixing together:

a) a fountain solution concentrate including:
   - water in about 64% by volume;
   - isopropyl alcohol in about 9% by volume;
   - glycerin in about 8% by volume;
   - 2-butoxy-ethanol in about 9% by volume;
   - ethylene glycol in about 5% by volume;
   - propylene glycol in about 5% by volume; and b) water, wherein said fountain solution having a water to fountain solution concentrate ratio in a range from about 5:1 to about 7:1.

* * * * *